UNITED STATES PATENT OFFICE.

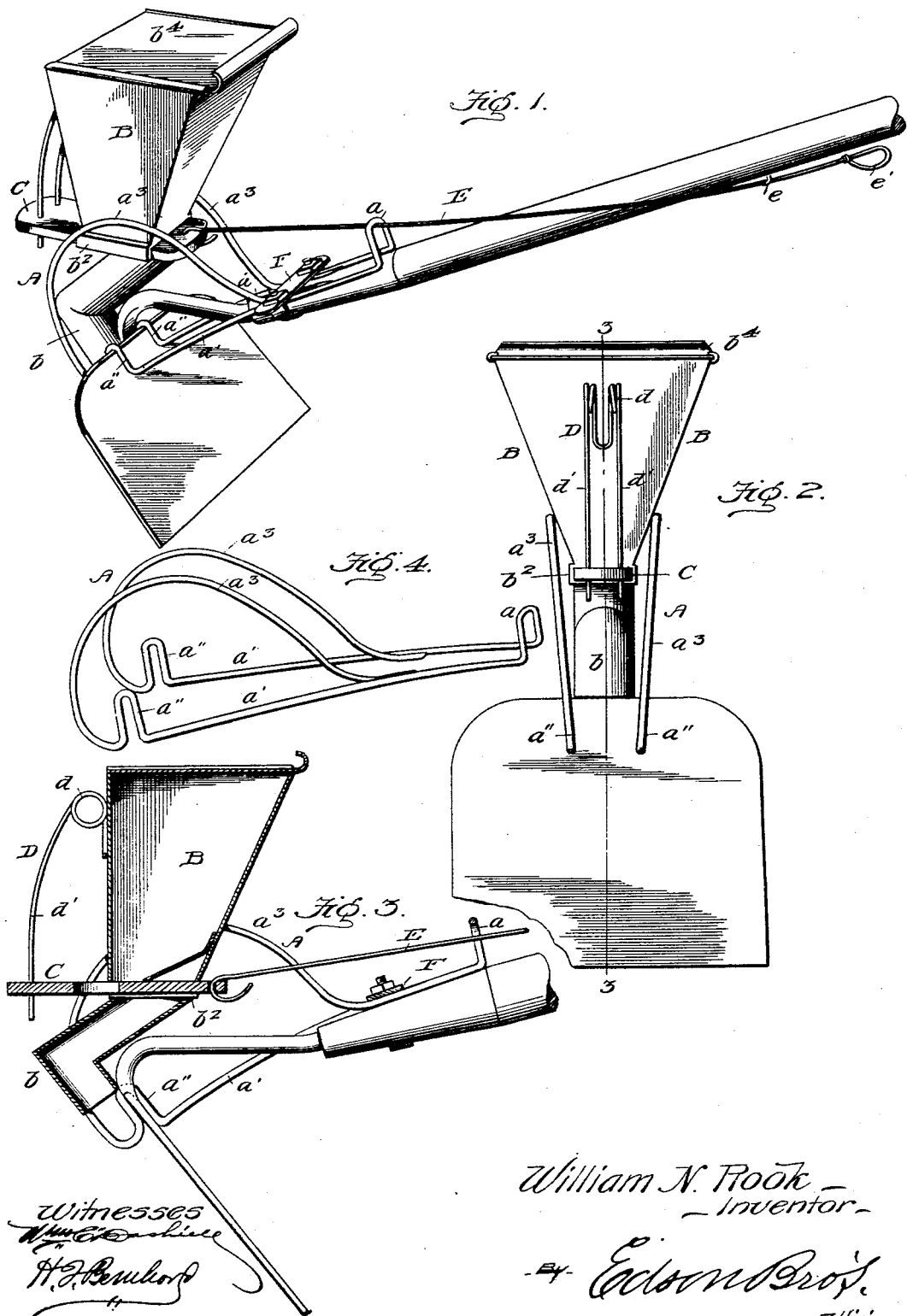

WILLIAM NATHAN ROOK, OF UNION CITY, TENNESSEE, ASSIGNOR OF ONE-THIRD TO JAMES M. OWNBY, OF SAME PLACE.

SEED-DROPPING ATTACHMENT.

SPECIFICATION forming part of Letters Patent No. 586,457, dated July 13, 1897.

Application filed April 24, 1897. Serial No. 633,747. (No model.)

*To all whom it may concern:*

Be it known that I, WILLIAM NATHAN ROOK, a citizen of the United States, residing at Union City, in the county of Obion and State of Tennessee, have invented certain new and useful Improvements in Seed-Dropping Attachments for Agricultural Implements; and I do hereby declare the following to be a full, clear, and exact description of the invention, such as will enable others skilled in the art to which it appertains to make and use the same.

My invention relates to hand devices for planting corn or seeds; and the object that I have in view is to provide a simple and cheap attachment to hoes to be used for the purpose of replacing seeds or grain in ground that may require replanting.

To the accomplishment of these ends, my invention consists in a carrier constructed for application to the head and staff of an agricultural implement, such as a hoe, means for rigidly holding said carrier on the implement, a hopper mounted on the carrier and having a conducting-spout arranged to clear the blade or head of the implement, a regulating-slide, and means for operating said slide; and the invention further consists in the construction and arrangement of parts, which will be hereinafter fully described and claimed.

To enable others to understand my invention, I have illustrated the preferred embodiment of the same in the accompanying drawings, forming a part of this specification, and in which—

Figure 1 is a perspective view showing my invention applied to a hoe. Fig. 2 is a front elevation. Fig. 3 is a longitudinal central sectional view on the plane indicated by the dotted line 3 3 of Fig. 2. Fig. 4 is a detail perspective view of the carrier detached from the implement.

Like letters of reference denote corresponding parts in all the figures of the drawings.

My seed-planting attachment for agricultural implements comprises a carrier A, a seed-hopper B, having a conducting-spout $b$, a slide C, means for operating the slide, and means for clamping the carrier upon the implement.

In the accompanying drawings I have shown the carrier and, in fact, the attachment constructed for application to an agricultural hoe, but I wish it to be understood that I do not strictly limit myself to the use of my attachment in connection with hoes, because it is evident that the carrier may be made in a way for attaching it to other styles of agricultural implements.

The embodiment of the carrier shown in the accompanying drawings is made from a piece of stout wire or rod metal bent at its middle to provide the eye or loop $a$, the base-strands $a'$, which have the bent seats $a''$ near their front ends, the arched or bow-shaped upper strands $a^3$, and the free ends of the wire are then carried back to the base-strands and united thereto, as at $a^4$, near the loop or eye $a$. The arched or bow-shaped strands $a^3$ of the carrier lie above the base-strands and the joined ends of the wire form a shank for the carrier, which enables it to fit snugly upon the staff or handle of the implement.

The hopper B is arranged between the arched upper strands of the carrier, and it is fastened thereto in any suitable way, so as to occupy a fixed relation to the carrier. The upper open end of the hopper is designed to be closed by a suitable cover or slide $b^4$, and at the bottom of the hopper is provided a transverse guideway $b^2$. From the guideway depends the conducting-spout $b$, which is bent or inclined forward and then downward, as shown by the drawings, whereby the hopper is mounted on the carrier, and its spout or tube is arranged to clear the head or blade of the implement when the attachment is applied to such implement.

In the guideway $b^2$ of the hopper is fitted a seed-dropping plate C, which I prefer to make in the form of a slide which may be readily removed by the user for the purpose of interchanging it with other slides designed to meet the requirements for dropping one, two, or more seeds or grains, according to the nature of the seed to be planted. I prefer to have the slide C made of wood, so that the farmer can make his own slides and provide them with holes or openings according to the number and size of seeds it may be desired to plant. The guideway $b^2$ opens at its ends to enable the slide to extend through the guideway and protrude at both ends beyond the hopper and said way not only for the purpose of attaching the slide-operating devices, but for the purpose of easily withdrawing and replacing the slide. The slide is normally drawn in one direction, so as to keep its opening or holes out of alinement with the tube or spout, by means of a spring D, which, as shown herein, is bent from wire to form the coil $d$ and the elastic arms $d'$. The end of the spring beyond its coiled part is attached or fastened to the hopper in an appropriate way, while the spring-arms $d'$ are fitted in openings in one protruding end of the slide. To the other end of the slide is attached a pull rod or cord E, which passes through the loop or guide $a$ of the carrier, thence extends along and around the staff of the implement, passes through a staple or eye $e$, fastened to the lower side of the staff, and terminates in a finger-loop $e'$, which is convenient to the operator.

The attachment is clamped to the implement by means of a clamp F, one form of which consists of a yoke with threaded ends, a transverse plate, and suitable binding-nuts.

To apply my seed dropping or planting attachment to a hoe, the carrier is adjusted to have its shank bear upon the top of the ferrule or staff of the hoe and to have its seats $a''$ straddle the head or blade of the hoe, the shank of the hoe lying between the base-strands $a'$ of the carrier, and the spout $b$ of the attachment arranged to terminate in front of the head or blade of the hoe, so that the seed may be dropped without hindrance from the implement. The clamp F is adjusted to embrace the shank of the carrier and the hoe-staff and to draw the carrier firmly against the staff and blade of the hoe, so as to hold it rigidly in place, and the slide is now adjusted in the bottom of the hopper, the spring D attached to the slide, and the pull rod or wire connected to the slide and led through the guides or loops $a\ e$.

The hoe may be used in the ordinary way for cultivating the ground, and when the operator finds that the seed should be replanted it is only necessary to pull on the rod or wire so as to adjust the slide to drop the seed in the proper place, after which the spring returns the slide and rod to their normal positions. Of course the implement may be used generally for cultivating and planting purposes, but it is especially useful in replanting ground. The seed-dropping attachment may be removed from the hoe and the latter used in the ordinary way. My attachment may be applied to hoes of different sizes and, as before explained, the carrier may be made to apply the device to other kinds of implements than hoes.

The attachment is simple, durable, and cheap. It is readily applicable and removable and it is easy and convenient of manipulation.

I am aware that changes in the form and proportion of parts and in the details of construction herein shown and described as the preferred embodiment of my invention may be made by a skilled mechanic without departing from the spirit or sacrificing the advantages of my invention, and I therefore hold myself at liberty to make such alterations and changes as fairly fall within the scope of my invention.

Having thus fully described my invention, what I claim as new, and desire to secure by Letters Patent, is—

1. A seed-dropping attachment for hand implements comprising a carrier constructed for application to the head and shank of an agricultural implement, a hopper mounted on the carrier and having a spout arranged to clear the implement, a slide with means for operating the same, and a clamp to hold the attachment rigidly in place on an implement, substantially as and for the purposes described.

2. In a seed-dropping attachment for hand implements, a carrier having its base formed with a shank and with seats to fit the staff and blade of an implement, combined with a hopper mounted on the carrier and having a spout arranged to clear the carrier and implement, a seed-dropper plate, and means for clamping the carrier in position, substantially as and for the purposes described.

3. In a seed-dropping attachment for hand implements, the carrier having its base formed with a shank, an eye or loop, and the seats and also provided with the arched or bowed upper member, combined with a hopper fastened to the arched member, a slide fitted in the hopper, a spring connected to the slide, and a pull rod or wire, substantially as described.

4. The combination with an agricultural implement, of a carrier fitted to the staff and head of said implement, means for clamping the carrier rigidly in place, a hopper mounted on the carrier and provided with a conducting-spout arranged to deposit its contents in advance of the implement-head, a dropping-slide in said hopper, and an operating-rod attached to the slide and fitted in guides on the implement, as and for the purposes described.

In testimony whereof I affix my signature in presence of two witnesses.

WILLIAM NATHAN ROOK.

Witnesses:
F. M. TEROATHAN,
J. M. OWNBY.